United States Patent
Medapalli et al.

(10) Patent No.: US 11,343,778 B2
(45) Date of Patent: May 24, 2022

(54) TRANSMIT WAVEFORM SHAPING FOR WIRELESS COMMUNICATIONS DEVICES

(71) Applicant: Cypress Semiconductor Corporation, San Jose, CA (US)

(72) Inventors: Kamesh Medapalli, San Jose, CA (US); Yanbing Zhang, Basking Ridge, NJ (US); Yan Li, Morganville, NJ (US); David G. Wright, San Mateo, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/031,677

(22) Filed: Sep. 24, 2020

(65) Prior Publication Data

US 2022/0095242 A1    Mar. 24, 2022

(51) Int. Cl.
*H04W 52/34* (2009.01)
*H04W 52/32* (2009.01)
*H04W 52/58* (2009.01)

(52) U.S. Cl.
CPC ......... *H04W 52/34* (2013.01); *H04W 52/325* (2013.01); *H04W 52/58* (2013.01)

(58) Field of Classification Search
CPC ....... H04W 24/00; H04W 4/80; H04W 52/34; H04W 52/325

USPC ....... 455/522, 452.1, 452.2, 41.1, 41.2, 41.3
See application file for complete search history.

(56) References Cited

U.S. PATENT DOCUMENTS

| | | | |
|---|---|---|---|
| 2012/0281638 A1* | 11/2012 | Ly-Gagnon | H04W 8/005 370/329 |
| 2016/0330575 A1* | 11/2016 | Chen | H04W 52/0216 |
| 2020/0245261 A1* | 7/2020 | Othman | H04W 52/362 |
| 2020/0344618 A1* | 10/2020 | Shetiya | H04W 74/0808 |

* cited by examiner

*Primary Examiner* — John J Lee

(57) ABSTRACT

Systems, methods, and devices shape waveforms associated with transmission of data from wireless communications devices. Methods may include identifying, using a processing device, a plurality of portions of a Bluetooth packet for transmission from a wireless communications device, the plurality of portions comprising a first portion and a second portion. Methods may also include determining, using the processing device, a first transmit power associated with the first portion and a second transmit power associated with the second portion, the determining being based, at least in part, on whether the first portion or second portion is used in packet detection. Methods may further include transmitting the first portion of the Bluetooth packet using the first transmit power, and transmitting the second portion of the Bluetooth packet using the second transmit power.

20 Claims, 7 Drawing Sheets

TRANSMIT WAVEFORM SHAPING FOR WIRELESS COMMUNICATIONS DEVICES

TECHNICAL FIELD

This disclosure generally relates to wireless communications devices, and more specifically, to waveform shaping associated with wireless communications devices.

BACKGROUND

Wireless communications devices may communicate with each other via one or more communications modalities, such as a WiFi connection or a Bluetooth connection. Accordingly, such wireless communication may be implemented in a manner compliant with a wireless communication protocol. Moreover, such wireless communications devices may include various hardware components to facilitate such communication. For example, wireless communications devices may include transmission media that may include one or more antennas. Conventional techniques for transmitting and detecting data packets between wireless communication devices remain limited because they are limited in their ability to increase sensitivity while conserving transmit power.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Figure 1:
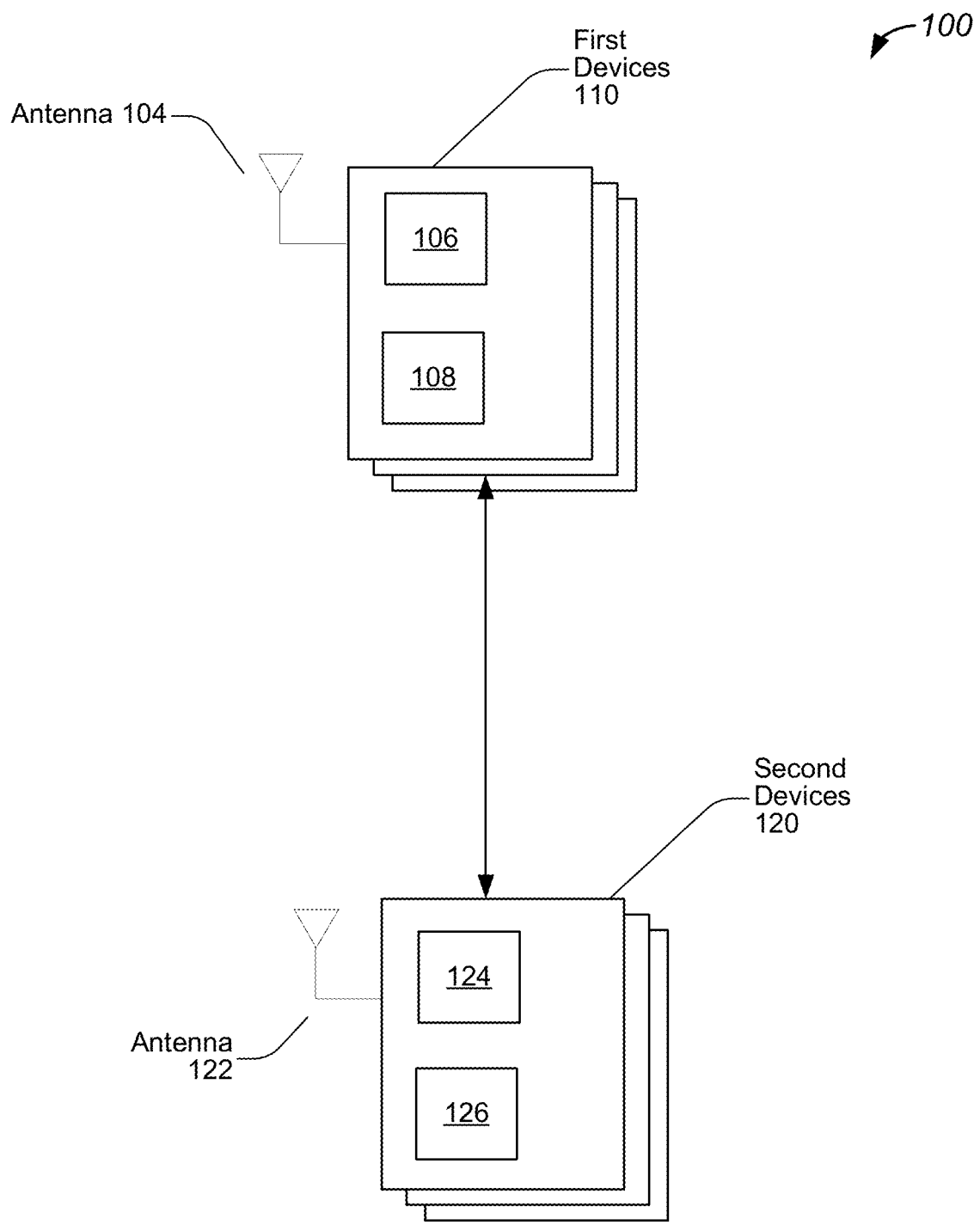
FIG. 1 illustrates an example of a system for transmit waveform shaping for wireless communications devices, configured in accordance with some embodiments.

FIG. 1 illustrates an example of a system for transmit waveform shaping for wireless communications devices, configured in accordance with some embodiments. As shown in FIG. 1, various wireless communications devices may communicate with each other via one or more wireless communications media. For example, wireless communications devices may communicate with each other via a Bluetooth connection. In various embodiments, the wireless communications devices may first establish connections or communications links before data transfer occurs. Once a communications link is established, packetized network traffic may be sent over a communications network. Accordingly, data packets may be sent and received between such wireless communications devices. As will be discussed in greater detail below, wireless communications devices disclosed herein and systems, such as system 100, that implement such wireless communications devices are configured to increase the performance of receiving devices by enhancing data packet detection. Accordingly, embodiments disclosed herein enable increased data packet detection with reduced power consumption.

In various embodiments, system 100 may include first devices 110 which may be wireless communications devices. As discussed above, such wireless communications devices may be compatible with one or more wireless transmission protocols, such as a Bluetooth protocol. In some embodiments, first devices 110 are low energy Bluetooth devices that are compatible with a Bluetooth Low Energy specification and protocol, also referred to as Bluetooth Smart. Moreover, such wireless communications devices may be smart devices, such as those found in wearable devices, or may be monitoring devices, such as those found in smart buildings, environmental monitoring, and energy management. It will be appreciated that such wireless communications devices may be any suitable device, such as those found in cars, other vehicles, and even medical implants.

As shown in FIG. 1, various wireless communications devices may be in communication with each other via one or more wireless communications mediums. As shown in FIG. 1, first devices 110 may each include an antenna, such as antenna 104. First devices 110 may also include processing device 108 as well as transceiver 106. As will be discussed in greater detail below, such processing devices, transceivers, and radios may be configured to send and receive data packets between each other, and utilize portions of data packets for the purposes of data packet detection and synchronization events. More specifically, as will be discussed in greater detail below with reference to FIG. 2-7, different components of first devices 110 may be configured to selectively boost transmit power for portions of a data packet during transmission to increase data packet detection by receiving devices.

In some embodiments, system 100 may further include second devices 120 which may also be wireless communications devices. As similarly discussed above, second devices 120 may be compatible with one or more wireless transmission protocols, such as a Bluetooth protocol. Moreover, second devices 120 may also be smart devices or other devices, such as those found in cars, other vehicles, and medical implants. In various embodiments, second devices 120 may be different types of devices than first devices 110. As discussed above, each of second devices 120 may include an antenna, such as antenna 122, as well as processing device 126 and transceiver 124, which may also be configured to establish communications connections with other devices, and transmit and receive data in the form of data packets via such communications connections. Accordingly, as discussed above, second devices 120 may also be configured to selectively boost transmit power for portions of a data packet during transmission to increase data packet detection by receiving devices.

Figure 2:
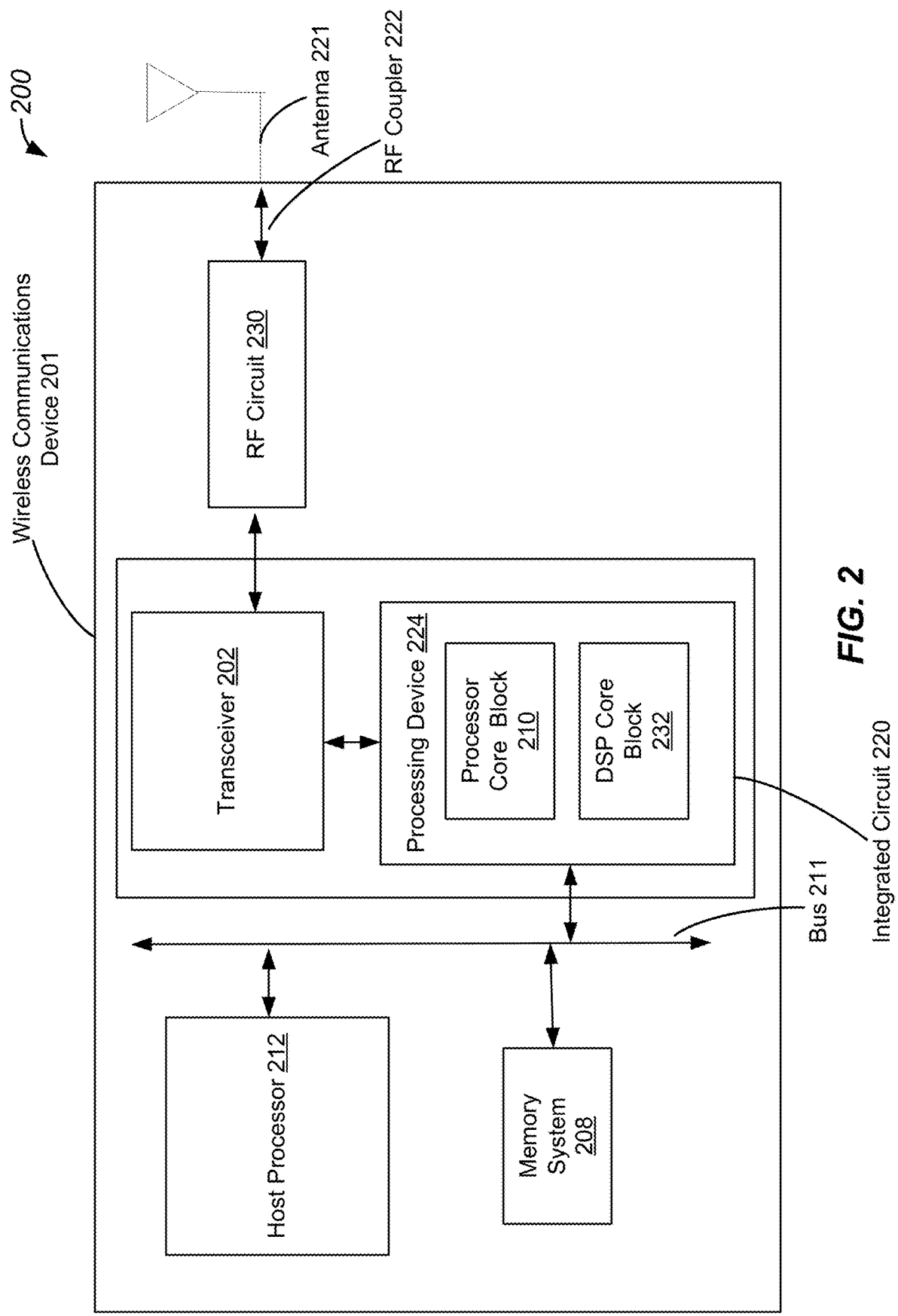
FIG. 2 illustrates an example of another system for transmit waveform shaping for wireless communications devices, configured in accordance with some embodiments.

FIG. 2 illustrates an example of another system for transmit waveform shaping for wireless communications devices, configured in accordance with some embodiments. More specifically, FIG. 2 illustrates an example of a system, such as system 200, that may include wireless communications device 201. It will be appreciated that wireless communications device 201 may be one of any of first devices 110 or second devices 120 discussed above. In various embodiments, wireless communications device 201 includes a transceiver, such as transceiver 202, which may be a transceiver such as transceivers 106 and 124 discussed above. In one example, system 200 includes transceiver 202 which is configured to transmit and receive signals using a communications medium that may include antenna 221. Accordingly, transceiver 202 may include a transmitter having one or more components forming a transmit path, and may also include a receiver having one or more components forming a receive path. As noted above, transceiver 202 may be included in a Bluetooth radio, and may be compatible with a Bluetooth Low Energy communications protocol. Accordingly, packets disclosed herein may be Bluetooth packets. In some embodiments, the packets may be Bluetooth Low Energy packets. Accordingly, transceiver 202 may include components, such as a modulator and demodulator as well as one or more buffers and filters, that are configured to generate and receive signals via antenna 221.

In various embodiments, system 200 further includes processing device 224 which may include logic implemented using one or more processor cores. Accordingly, processing device 224 is configured to a controller, as will be discussed in greater detail below. In various embodiments, processing device 224 includes one or more processing devices that are configured to implement timing and transmit power computations that will be described in greater detail below. In various embodiments, processing device 224 includes one or more components configured to implement a medium access control (MAC) layer that is configured to control hardware associated with a wireless transmission medium, such as that associated with a Bluetooth transmission medium. In one example, processing device 224 may include processor core block 210 that may be configured to implement a driver, such as a Bluetooth driver. Processing device 224 may further include digital signal processor (DSP) core block 232 which may be configured to include microcode.

In various embodiments, processor core block 210 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack and a controller stack are implemented using at least processor core block 210. The host stack is configured to include layers for a Bluetooth network encapsulation protocol, radio frequency communication, service discovery protocol, as well as various other high-level data layers. The controller stack is configured to include a link management protocol, a host controller interface, a link layer which may be a low energy link layer, as well as various other timing critical layers.

System 200 further includes radio frequency (RF) circuit 230 which is coupled to antenna 221. In various embodiments, RF circuit 230 may include various components such as an RF switch, a diplexer, and a filter. While FIG. 2 illustrates system 200 as having a single antenna, it will be appreciated that system 200 may have multiple antennas. Accordingly, RF circuit 230 may be configured to select an antenna for transmission/reception, and may be configured to provide coupling between the selected antenna, such as antenna 221, and other components of system 200 via a bus, such as bus 211.

System 200 includes memory system 208 which is configured to store one or more data values associated with timing and transmit power computations discussed in greater detail below. Accordingly, memory system 208 includes storage device, which may be a non-volatile random access memory (NVRAM) configured to store such data values, and may also include a cache that is configured to provide a local cache. In various embodiments, system 200 further includes host processor 212 which is configured to implement processing operations implemented by system 200.

It will be appreciated that one or more of the above-described components may be implemented on a single chip, or on different chips. For example, transceiver 202 and processing device 224 may be implemented on the same integrated circuit chip, such as integrated circuit chip 220. In another example, transceiver 202 and processing device 224 may each be implemented on their own chip, and thus may be disposed separately as a multi-chip module or on a common substrate such as a printed circuit board (PCB). It will also be appreciated that components of system 200 may be implemented in the context of a low energy device, a smart device, or a vehicle such as an automobile. Accordingly, some components, such as integrated chip 220, may be implemented in a first location, while other components, such as antenna 221, may be implemented in second location, and coupling between the two may be implemented via a coupler such as RF coupler 222.

Figure 3:
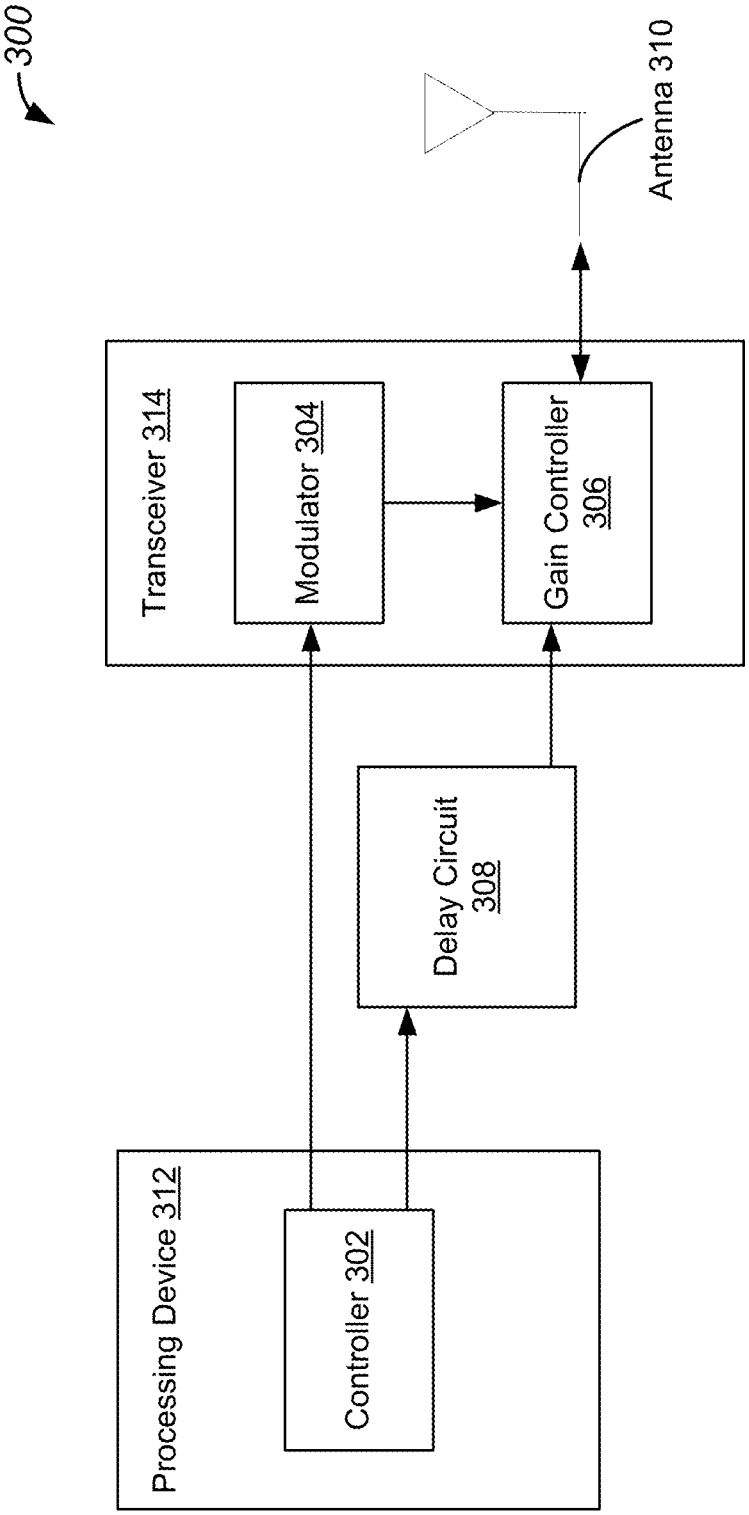
FIG. 3 illustrates an example of yet another system for transmit waveform shaping for wireless communications devices, configured in accordance with some embodiments.

FIG. 3 illustrates an example of yet another system for transmit waveform shaping for wireless communications devices, configured in accordance with some embodiments. As discussed above, a transmit power may be modified during transmission of a data packet to shape a transmit waveform associated with the data packet in a manner that enables enhanced data packet detection by the receiving device while also reducing an amount of power utilized. Thus, according to some embodiments, a system, such as system 300, may be configured to implement such transmit waveform shaping.

In various embodiments, system 300 includes controller 302 which may be implemented as processing logic included in a processing device, such as processing device 312. As will be discussed in greater detail below, controller 302 is configured to obtain timing data and transmit power data. Accordingly, controller 302 may be configured to generate and/or retrieve such data. Moreover, controller 302 is further configured to generate one or more control signals based on such timing data and transmit power data.

As shown in FIG. 3, controller 302 may be communicatively coupled to various other components of system 300. For example, controller 302 may be coupled to digital modulator 304 and configurable radio frequency (RF) gain 306 which may be included in a transceiver, such as transceiver 314. In some embodiments, modulator 304 may be configured to implement modulation operations in accordance with a wireless transmission protocol, such as a Bluetooth protocol. Accordingly, modulator 304 is configured to obtain transmit data, such as a data packet, and modulate the transmit data for transmission.

Once modulated, modulator 304 may provide the data to configurable RF gain 306 which is configured to apply a designated gain prior to transmission via an antenna, such as antenna 310. As will be discussed in greater detail below, the gain implemented by configurable RF gain 306 is configurable, and may be determined based on a control signal received from controller 302. Thus, as will be discussed in greater detail below, controller 302 is configured to generate and send a first control signal to configurable RF gain 306 to implement a first gain and a first transmit power. Moreover, controller 302 is further configured to generate and send a second control signal to configurable RF gain 306 to implement a second gain and a second transmit power. As will also be discussed in greater detail below, such implementation of control signals and different gains may occur during data packet transmission and between transmission of different parts of the data packet. In this way, transmit power for different portions of the data packet may be selectively boosted or attenuated.

In some embodiments, system 300 further includes delay circuit 308 which may be implemented between controller 302 and configurable RF gain 306. Delay circuit 308 is configured to implement a designated delay that is configured to compensate for any delay caused by modulator 304 and its associated modulation operations. Accordingly, delay circuit 308 is configured to enable the delivery of a control signal to configurable RF gain 306 in a manner that is concurrent with the reception of corresponding modulated data from modulator 304.

Figure 4:
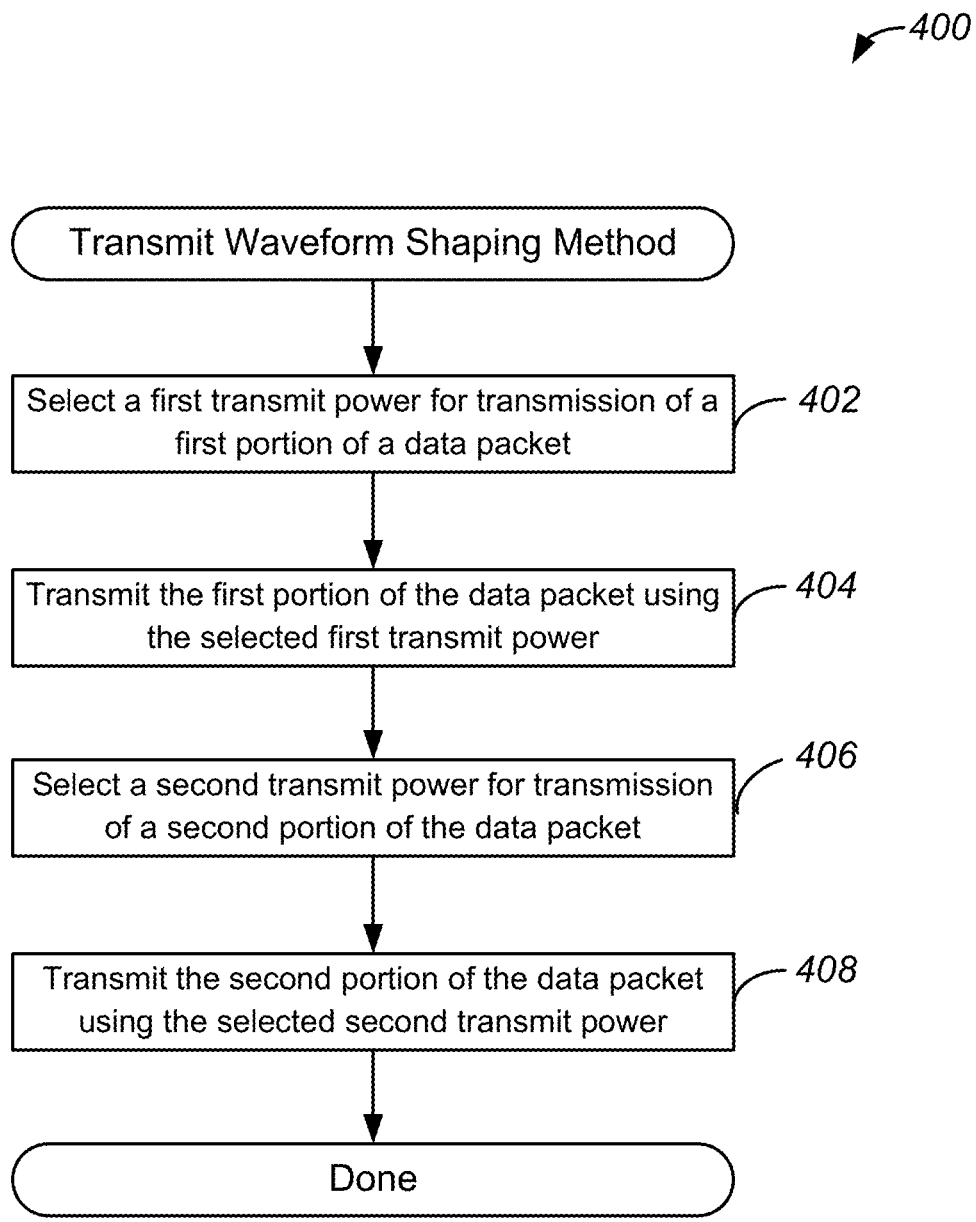
FIG. 4 illustrates an example of a method for transmit waveform shaping for wireless communications devices, implemented in accordance with some embodiments.

FIG. 4 illustrates an example of a method for transmit waveform shaping for wireless communications devices, implemented in accordance with some embodiments. As discussed above, embodiments disclosed herein enable the shaping of transmit power used during data packet transmission. As will be discussed in greater detail below, a method, such as method 400, may be implemented to selectively boost transmit power for portions of the data packet used to detect the data packet while using less transmit power for other portions of the data packet.

Accordingly, method 400 may commence with operation 402 during which a first transmit power may be selected. As similarly discussed above, the first transmit power may be determined based on one or more transmission parameters, such as a maximum permissible transmission power permitted by a wireless communications protocol, or one or more other designated constraints. In various embodiments, during operation 402, a system component, such as a controller, may identify the first transmit power based on one or more stored data values. Such data values may have been previously determined during one or more configuration operations, as will be discussed in greater detail below with reference to FIG. 6. During operation 402, the controller may also set a configurable RF gain to implement the first transmit power.

Method 400 may proceed to operation 404 during which a first portion of a data packet may be transmitted using the first transmit power. Accordingly, a first portion of the data packet may be transmitted using the first transmit power. As similarly discussed above, the first portion of the data packet may be a portion that is used for packet detection by a receiving device. Accordingly, the first portion of the data packet may be a packet header. As will be discussed in greater detail below with reference to FIG. 7, the first portion may include a preamble and an access address of a Bluetooth packet, and the first transmit power may be bounded by a maximum permitted transmit power specified by the Bluetooth transmission protocol.

Method 400 may proceed to operation 406 during which a second transmit power may be selected. As similarly discussed above, the second transmit power may be determined based on one or more transmission parameters or one or more other designated constraints. In various embodiments, the second transmit power may be a standard transmission power used by the wireless communications device during normal operation. Thus, according to some embodiments, the second transmit power is less than the first transmit power and enable the usage of less power for the remainder of the data packet. In some embodiments, during operation 406, a system component, such as a controller, may identify the second transmit power based on one or more stored data values. Furthermore, during operation 406, the controller may also set the configurable RF gain to implement the second transmit power.

Method 400 may proceed to operation 408 during which a second portion of the data packet may be transmitted using the second transmit power. Accordingly, as discussed above, the second portion of the data packet may be transmitted using the second transmit power. In various embodiments, the second portion of the data packet may be a packet payload. As will be discussed in greater detail below with reference to FIG. 7, the second portion may include the payload data and CRC data values as defined by a Bluetooth transmission protocol, and the second transmit power may be determined, at least in part, by a standard transmit power specified by the Bluetooth transmission protocol.

Figure 5:
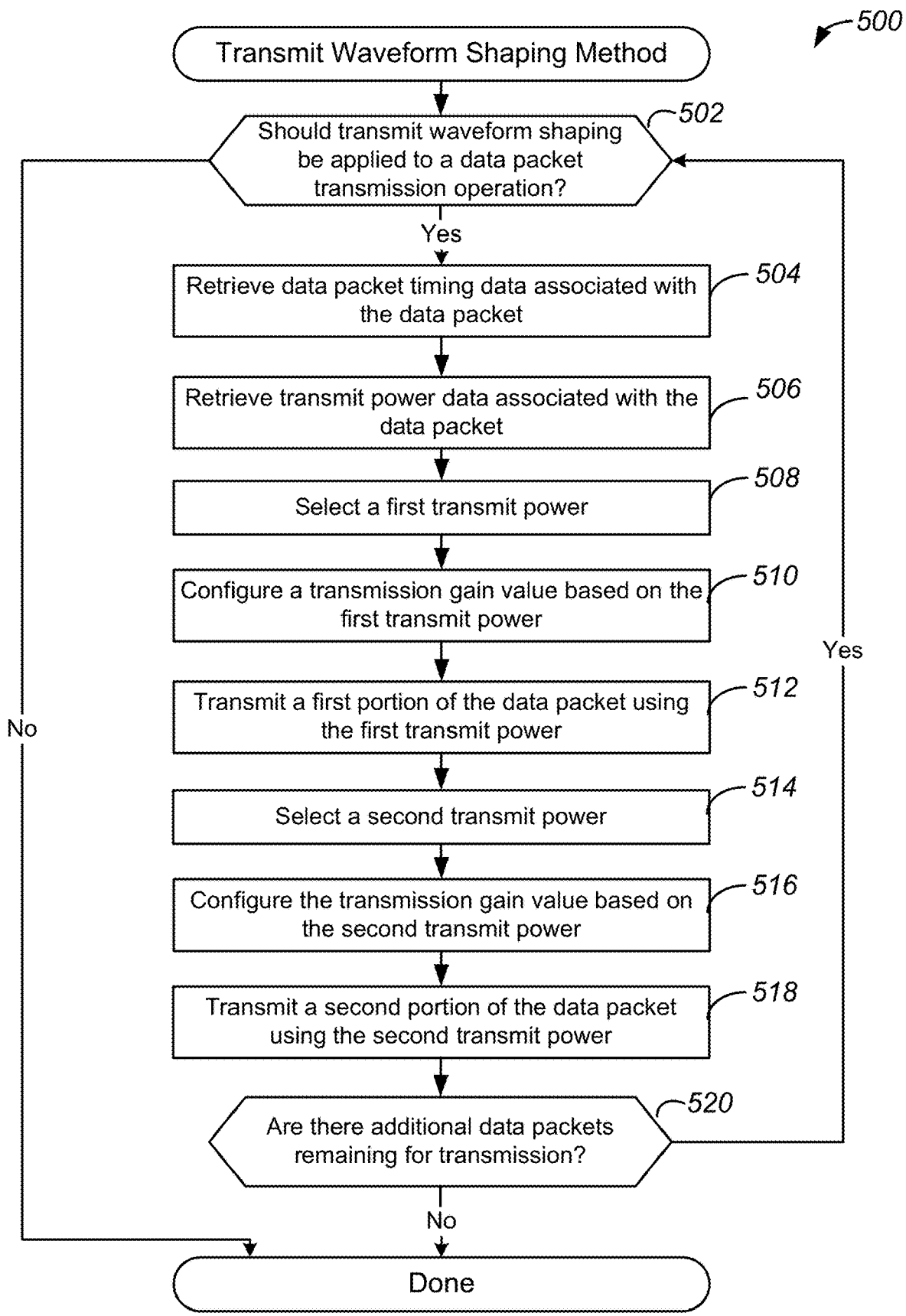
FIG. 5 illustrates an example of another method for transmit waveform shaping for wireless communications devices, implemented in accordance with some embodiments.

FIG. 5 illustrates an example of another method for transmit waveform shaping for wireless communications devices, implemented in accordance with some embodiments. As discussed above, embodiments disclosed herein enable the shaping of transmit power used during data packet transmission. As will be discussed in greater detail below, a method, such as method 500, may be implemented to utilize timing information and a configurable RF gain to selectively boost transmit power for portions of the data packet used to detect the data packet.

Accordingly, method 500 may commence with operation 502 during it may be determined if transmit waveform shaping should be applied. In various embodiments, such a determination may be made based on one or more performance or signal quality metrics. For example, such a determination may be made based on a value of a signal to noise ratio (SNR) metric, or some other metric, such as a received signal strength indicator (RSSI) metric. More specifically, if the value of the metric drops below a designated value, which may be a threshold value, transmit waveform shaping may be applied. However, if the value of the metric remains above the designated value, no transmit waveform shaping is applied. Accordingly, if it is determined that transmit waveform shaping should not be applied, method 500 may terminate. However, if it is determined that transmit waveform shaping should be applied, method 500 may proceed to operation 504.

Accordingly, during operation 504, data packet timing data may be retrieved. In various embodiments, a system component, such as a controller, has access to timing data for each data packet that is transmitted. The timing data may include one or more data values that identifies a duration of time for each portion of the data packet. Moreover, such timing data may be generated based on a known size of each portion of the data packet as well as the transmission frequency used for transmission. Furthermore, timing data may also identify specific time stamps for each portion of the data packet, as may be determined based on the previously described data and a time of transmission that may be used as a reference point. Accordingly, the controller may be configured to retrieve the timing data, and such timing data may provide time stamps for a time of transmission of each portion of the data packet.

Method 500 may proceed to operation 506 during which transmit power data values may be retrieved. Thus, according to some embodiments, the controller may also retrieve transmit power data values from memory. As will be discussed in greater detail below with reference to FIG. 6, the transmit power data values may identify a designated transmit power level for each portion of the data packet to be transmitted. Moreover, as will also be discussed in greater detail below, the transmit power levels may be determined based on one or more transmission parameters or one or more other designated constraints. In some embodiments, the transmit power data values may include a first transmit power associated with a first portion of a data packet, and may also include a second transmit power associated with a second portion of the data packet. It will be appreciated that while operations 504 and 506 describe data retrieval operations, in some embodiments, during operations 504 and 506, a system component, such as a controller may generate the timing data and transmit power data.

Method 500 may proceed to operation 508 during which the first transmit power may be selected. As discussed above, the transmit power data values include several designated transmit power levels. In various embodiment, a system component, such as a controller, is configured to identify a first power level based on predetermined portion of the data packet to be boosted. In one example, a packet header may have been predetermined to be the portion to be boosted based on one or more configuration parameters specified by a user or manufacturer. In another example, the predetermined portion of the data packet may have been predetermined by a designated number of data packet segments. For example, the first portion may be configured to be the first two segments of a data packet. Accordingly, during operation 508, a system component, such as a controller, may identify the first portion of a data packet, and a first transmit power associated with that first portion, as determined by the transmit power data values.

Method 500 may proceed to operation 510 during which a gain value may be configured based, at least in part, on the first transmit power. As similarly discussed above, a system component, such as a controller, may also set a configurable RF gain to implement the first transmit power. Accordingly, the controller may send a control signal to the configurable RF gain to configure the gain of the configurable RF gain to implement the first transmit power. As discussed above, there may be a direct data path between the controller and the configurable RF gain, thus enabling the controller to directly control the gain implemented by the configurable RF gain prior to and during data packet transmission.

Method 500 may proceed to operation 512 during which the first portion of the data packet may be transmitted using the first transmit power. Accordingly, the first portion of the data packet may be transmitted using the first transmit power. As similarly discussed above, the first portion of the data packet may be a portion that is used for packet detection by a receiving device. Accordingly, the portion of the data packet used by the receiving wireless communications device for data packet detection may be boosted in accordance with the first transmit power.

Method 500 may proceed to operation 514 during which the second transmit power may be selected. As similarly discussed above, the second transmit power may be determined based on one or more transmission parameters or one or more other designated constraints. In various embodiments, the second transmit power may be a standard transmission power used by the wireless communications device during normal operation. In some embodiments, the second transmit power may be less than a standard transmission power. Thus, the enhanced data packet detection provided by the usage of the first power level may enable the usage of less power for the remainder of the data packet. As similarly discussed above, during operation 514, a system component, such as a controller, may identify the second transmit power based on the transmit power data values.

Furthermore, during operation 516, the gain value may be configured based, at least in part, on the second transmit power. As similarly discussed above, a system component, such as a controller, may set the configurable RF gain to implement the second transmit power. Accordingly, the controller may send a control signal to the configurable RF gain to configure the gain of the configurable RF gain to implement the second transmit power. As discussed above, there may be a direct data path between the controller and the configurable RF gain, thus enabling the controller to directly control the gain implemented by the configurable RF gain. Thus, during operation 516, the gain implemented by the configurable RF gain may be modified during data packet transmission.

Method 500 may proceed to operation 518 during which the second portion of the data packet may be transmitted using the second transmit power. Accordingly, as discussed above, the second portion of the data packet may be transmitted using the second transmit power. As also discussed above, the second portion of the data packet may be a packet payload. As will be discussed in greater detail below with reference to FIG. 7, the second portion may include the payload data and CRC data values as defined by a Bluetooth transmission protocol.

Method 500 may proceed to operation 520 during which it may be determined if there are additional data packets to transmit. In various embodiments, a data transmission may include the transmission of multiple different data packets, each including a portion of the overall data transmission. Accordingly, during operation 514, it may be determined if there are additional data packets remaining that have not yet been transmitted. If it is determined that there are more data packets to be transmitted, method 500 may return to operation 502. If there are no more data packets to be transmitted and the transmission is complete, method 500 may terminate.

Furthermore, while various embodiments discussed above disclose the use of a first transmit power and a second transmit power, it will be appreciated that any suitable number of transmit power levels may be determined and utilized. Accordingly, method 500 may additionally include operations to determine a third transmit power, retrieve the third transmit power from transmit power data, configure a transmission gain value based on the third transmit power, and transmit a third portion of the packet based on the third transmit power. In this way, any number of transmit powers may be determined and implemented to precisely shape a transmit waveform to increase sensitivity during packet detection, and reduce power consumption during the transmission of other portions of the packet.

Figure 6:
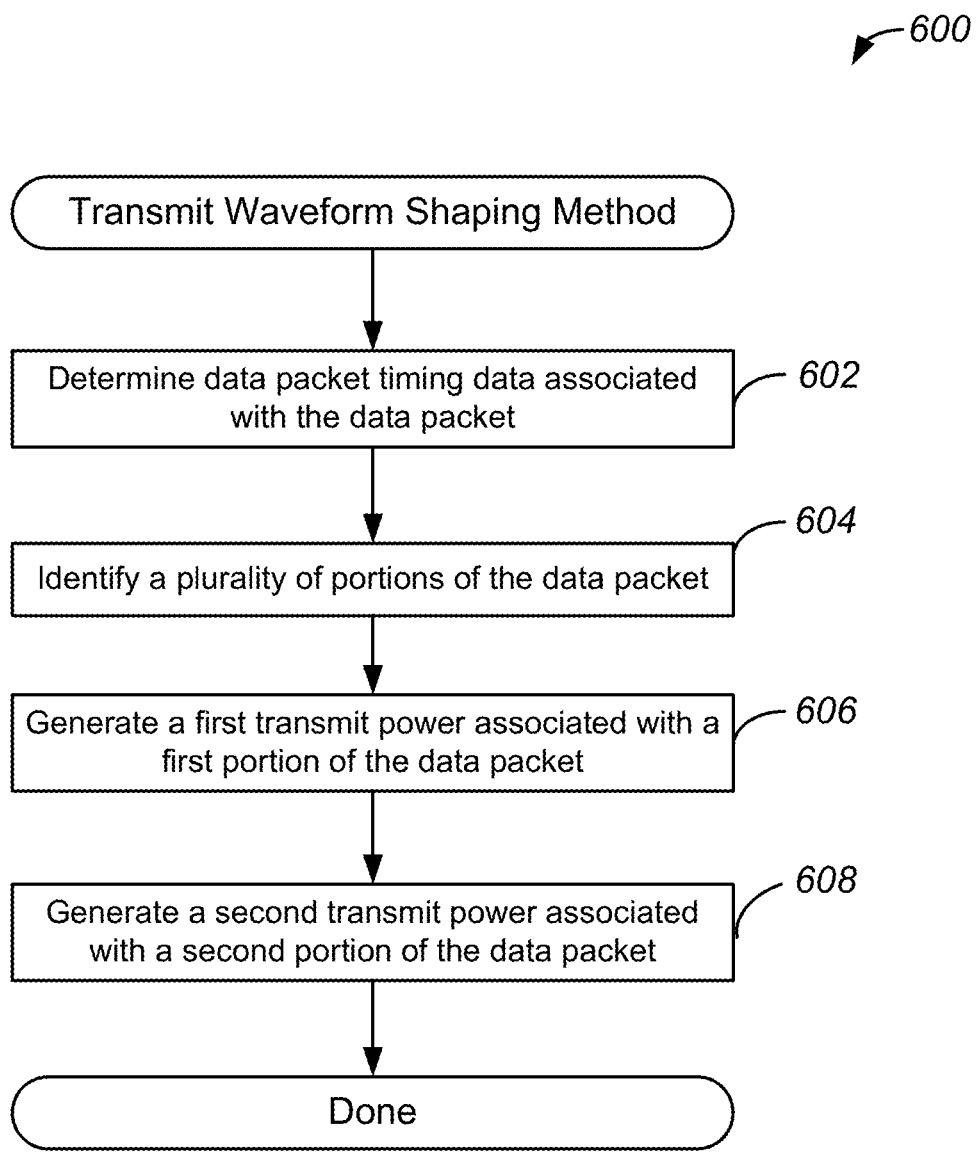
FIG. 6 illustrates an example of yet another method for transmit waveform shaping for wireless communications devices, implemented in accordance with some embodiments.

FIG. 6 illustrates an example of yet another method for transmit waveform shaping for wireless communications devices, implemented in accordance with some embodiments. As discussed above, embodiments disclosed herein enable the shaping of transmit power used during data packet transmission. As will be discussed in greater detail below, a method, such as method 600, may be implemented to configure one or more system components to implement the previously described selective application of different transmit powers.

Method 600 may commence with operation 602 during which data packet timing data may be determined. As similarly discussed above, a system component, such as a controller, may have access to timing data for each data packet that is transmitted. The timing data may include one or more data values that identify a relative time at which each part of the data packet begins and/or ends. For example, the timing data may identify a relative start time for a data packet preamble, access address, payload, and cyclic redundancy check. In various embodiments, the timing data may include time stamps, or some referenced indication of durations of the parts of the data packet. As discussed above, such timing data may be generated based on a known data size of each portion of the data packet as well as the transmission frequency used for transmission. Accordingly, the controller may be configured to retrieve or generate the timing data, and as will be discussed in greater detail below, such timing data may be used to configure the implementation of different transmit power levels.

Method 600 may proceed to operation 604 during which a plurality of portions of the data packet may be identified. Accordingly, during operation 604, a system component, such as a controller, may identify a first portion of the data packet that is to be boosted, and a second portion of the data packet that is not to be boosted. In some embodiments, the controller may identify the first and second portions based on one or more designated configuration parameters. For example, an entity, such as a user or administrator, may have previously designated that the parts of the data packet included in the data packet header are to be boosted, and are thus included in the first portion. In another example, the controller may automatically identify the parts of the data packet to be included in the first portion based on known data packet parts used in data packet detection and authentication operations. Accordingly, during operation 604, the controller may determine which parts of the data packet are included in the first portion and which parts of the data packet are included in the second portion.

Method 600 may proceed to operation 606 during which a first transmit power may be generated. As similarly discussed above, the transmit power data values may identify a designated transmit power level for each portion of the data packet to be transmitted. Moreover, such transmit power levels may be determined based on one or more transmission parameters or one or more other designated constraints. In various embodiments, the first transmit power may be determined by a maximum power level allowed by the wireless communications protocol being used. For example, a Bluetooth Low Energy (BLE) protocol may specify a maximum allowed power level, and such specified power level may be used as the value of the first transmit power. In another example, the first transmit power may be configured to be a fraction or percentage of such specified maximum value. In yet another example, the first transmit power may be determined based on a combination of constraints such as the specified maximum value as well as a maximum permitted or designated power integrated across the entire data packet.

Method 600 may proceed to operation 608 during which a second transmit power may be generated. As similarly discussed above, the second transmit power may be determined based on one or more transmission parameters or one or more other designated constraints. More specifically, the second transmit power may be a standard transmission power used by the wireless communications device during normal operation. For example, there may be an existing power control scheme determined based, at least in part, on the transmission protocol, and such a power control scheme may be used to determine the second transmit power. In some embodiments, the second transmit power may be less than a standard transmission power. Accordingly, the second transmit power may be a designated fraction or percentage of a normal operating transmit power.

Figure 7:
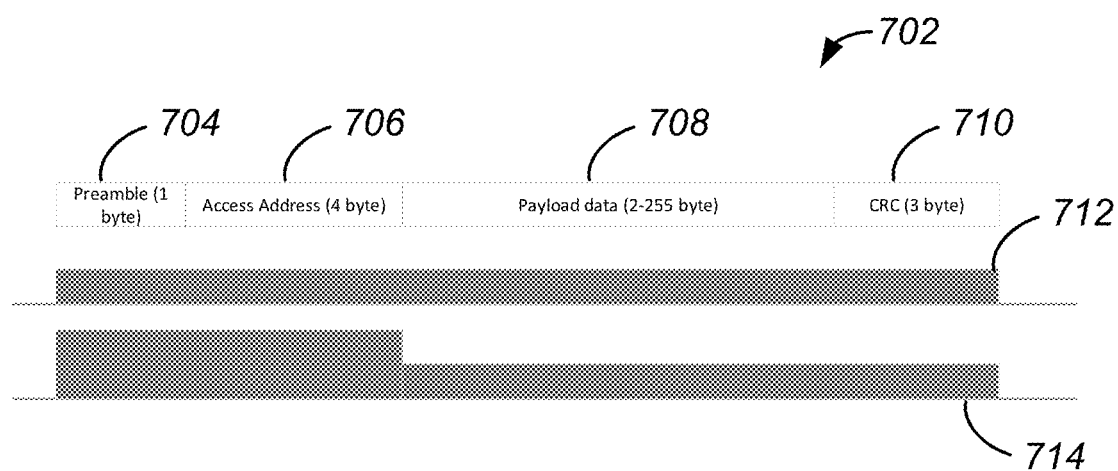
FIG. 7 illustrates an example of a diagram of a data packet and associated transmit powers, implemented in accordance with some embodiments.

FIG. 7 illustrates an example of a diagram of a data packet and associated transmit powers, implemented in accordance with some embodiments. As discussed above, a data packet may include various parts that may be determined or specified by a wireless communications protocol. For example, a wireless communications protocol may be a Bluetooth Low Energy (BLE) protocol, and a data packet, such as data packet 702, may have various parts, such as preamble 704, access address 706, payload 708, and cyclic redundancy check data values 710.

In some embodiments, first timing diagram 712 illustrates one example of transmit power utilized during transmission of data packet 702. As shown in FIG. 7, first timing diagram 712 shows a consistent power level used for transmission of the entirety of data packet 702. Alternatively, second timing diagram 714 illustrates another example of transmit power utilized during transmission of data packet 702. As shown in second timing diagram 714, a first portion of data packet 702 is boosted, and utilizes a higher power level than the remainder, or second portion, of data packet 702. Accordingly, as shown in second timing diagram 714, embodiments disclosed herein enable the use of a higher transmit power for increased packet detection, while also using a normal or lower transmit power for the remainder of the data packet. It will be appreciated that while a first portion of a data packet has been described as being boosted, any suitable portion of the data packet may be boosted.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   identifying, using a processing device, a plurality of portions of a Bluetooth packet for transmission from a wireless communications device, the plurality of portions comprising a first portion and a second portion;
   determining, using the processing device, a first transmit power associated with the first portion and a second transmit power associated with the second portion, the determining being based, at least in part, on whether the first portion or second portion is used in packet detection, the first transmit power being determined based, at least in part, on a transmission parameter defined by a wireless communications protocol;
   transmitting the first portion of the Bluetooth packet using the first transmit power; and
   transmitting the second portion of the Bluetooth packet using the second transmit power.

2. The method of claim 1, wherein the transmission parameter is a maximum permissible power defined by the wireless communications protocol of the wireless communications device.

3. The method of claim 1, wherein the first transmit power is determined in response to a signal quality metric being less than a designated threshold value.

4. The method of claim 1, wherein the first portion of the Bluetooth packet comprises values used for packet acquisition and synchronization.

5. The method of claim 4, wherein the first portion includes a preamble and access address, and wherein the second portion includes a packet payload.

6. The method of claim 5, wherein the Bluetooth packet is a Bluetooth Low Energy packet.

7. The method of claim 1 further comprising:
configuring a first transmission gain value based on the first transmit power; and
configuring a second transmission gain value based on the second transmit power.

8. The method of claim 7 further comprising:
transmitting, using the first transmission gain value, the first portion of the Bluetooth packet; and
transmitting, using the second transmission gain value, the second portion of the Bluetooth packet.

9. The method of claim 8, wherein the configuring of the transmission gain value based on the second transmit power is performed during transmission of the Bluetooth packet, and wherein the first transmit power is greater than the second transmit power.

10. A device comprising:
one or more processors configured to:
identify a plurality of portions of a Bluetooth packet for transmission from a wireless communications device, the plurality of portions comprising a first portion and a second portion; and
determine a first transmit power associated with the first portion and a second transmit power associated with the second portion, the determining being based, at least in part, on whether the first portion or second portion is used in packet detection, the first transmit power being determined based, at least in part, on a transmission parameter defined by a wireless communications protocol; and
a transmitter configured to:
transmit, via an antenna, the first portion of the Bluetooth packet using the first transmit power; and
transmit, via the antenna, the second portion of the Bluetooth packet using the second transmit power.

11. The device of claim 10, wherein the transmission parameter is a maximum permissible power defined by a wireless communications protocol of the wireless communications device.

12. The device of claim 10, wherein the first transmit power is determined in response to a signal quality metric being less than a designated threshold value.

13. The device of claim 10, wherein the first portion of the Bluetooth packet comprises values used for packet acquisition and synchronization, and wherein the Bluetooth packet is a Bluetooth Low Energy packet.

14. The device of claim 10, wherein the first transmit power is greater than the second transmit power.

15. The device of claim 10, wherein the transceiver is further configured to:
configure a transmission gain value based on the first transmit power and in response to a first control signal received from the one or more processors; and
configure the transmission gain value based on the second transmit power and in response to a second control signal received from the one or more processors.

16. A system comprising:
an antenna;
a controller comprising one or more processors configured to:
determine a first transmit power associated with a first portion of a packet and a second transmit power associated with a second portion of a packet, the determining being based, at least in part, on whether the first portion or second portion is used in data packet detection; and
a transceiver comprising:
a modulator configured to modulate values included in the first portion and the second portion of the data packet in accordance with a wireless communications protocol; and
a configurable radio frequency (RF) gain configured to:
apply a first transmission gain value to the first portion of the data packet based on the first transmit power; and
apply a second transmission gain value to the second portion of the data packet based on the second transmit power.

17. The system of claim 16, wherein the first transmit power is determined based, at least in part, on a maximum permissible power defined by a wireless communications protocol.

18. The system of claim 16, wherein the first transmit power is determined in response to a signal quality metric being less than a designated threshold value.

19. The system of claim 16, wherein the first portion of the Bluetooth packet comprises data values used for packet acquisition and synchronization, and wherein the Bluetooth packet is a Bluetooth Low Energy packet.

20. The system of claim 16, wherein the controller is further configured to:
generate a first control signal configured to cause the configurable RF gain to apply the first transmission gain value; and
generate a second control signal configured to cause the configurable RF gain to apply the second transmission gain value.

* * * * *